INVENTOR.
MILES J. WILLARD
BY
Christie, Parker & Hale
ATTORNEYS.

Aug. 1, 1967 M. J. WILLARD 3,333,966
POTATO COOKING AND MASHING
Filed Oct. 13, 1964 2 Sheets-Sheet 2
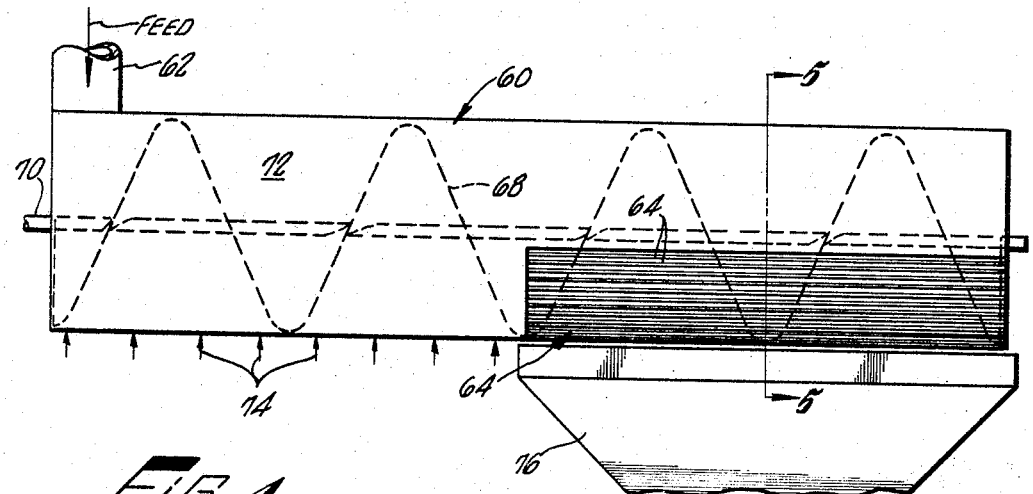
FIG_4_
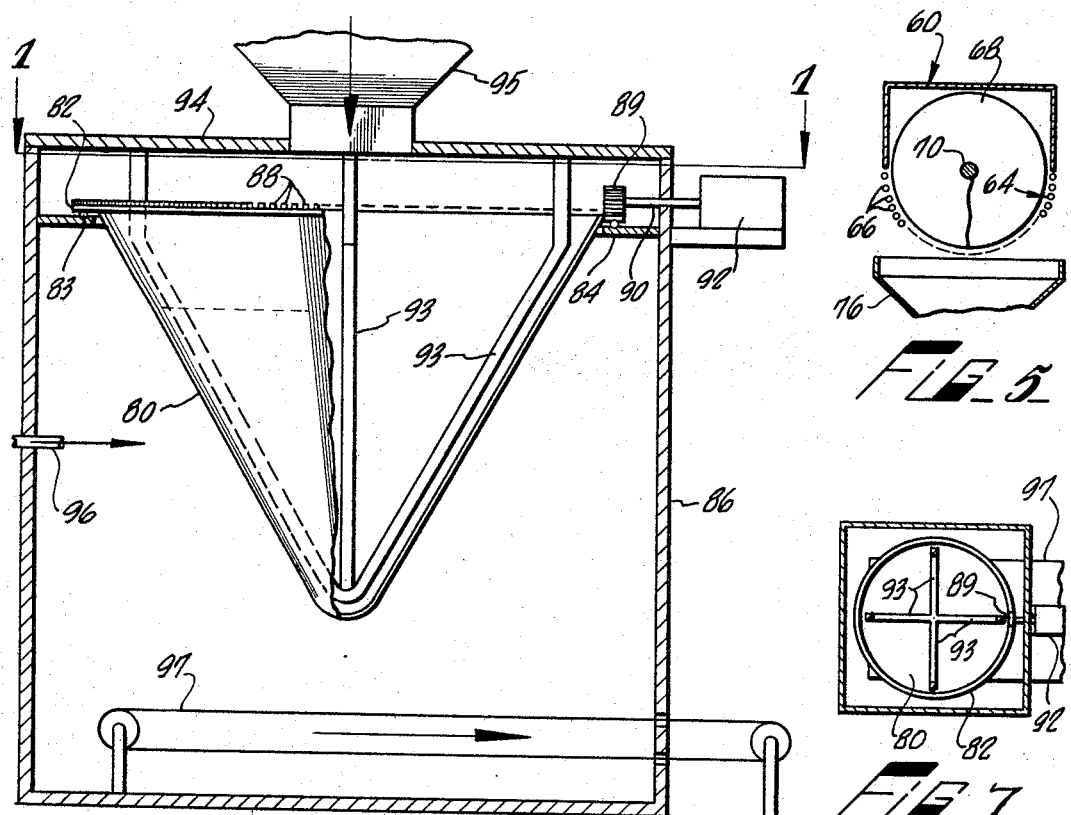
FIG_6_
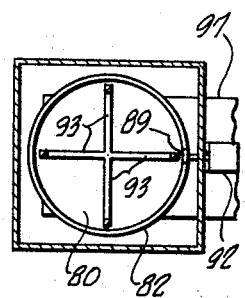
FIG_5_
FIG_7_
INVENTOR.
MILES J. WILLARD
BY
Christie, Parker & Hale
ATTORNEYS.

United States Patent Office 3,333,966
Patented Aug. 1, 1967

3,333,966
POTATO COOKING AND MASHING
Miles J. Willard, 3067 Gustafson Circle,
Idaho Falls, Idaho 83401
Filed Oct. 13, 1964, Ser. No. 403,624
11 Claims. (Cl. 99—100)

This invention relates to cooking and mashing potatoes.

In recent years, the potato industry has developed dehydrated mashed potatoes in powder and flake form that are quickly converted into mashed potatoes by mixing with hot or boiling liquid. In the process for the manufacture of these products it is necessary to produce a cooked, mashed potato which is then dehydrated by whichever method is chosen. Much attention has been given to the design of equipment and methods for cooking and mashing potatoes. In one standard continuous cooking method, potatoes are peeled, sliced optionally to about one-half inch thickness, and conveyed on a stainless steel wire mesh belt through a steam chamber maintained at atmospheric pressure. In another method, the sliced or whole potatoes are conveyed through a stainless steel screw conveyor fitted with a tight closed lid and a series of steam inlets along the bottom. Steam is introduced through the inlets to heat the potatoes to about the boiling point of water and maintain them at this temperature until the cooking is completed.

After the potatoes are cooked to the proper degree of softness, they are mashed, then dehydrated. In the standard granule process, the potatoes are frequently cooked whole, and mashing is accomplished in subsequent mixing steps of the process. In the flake process, a masher is normally employed before the potatoes are fed to the drum drier. These processes, well known to the art, are described in "Potato Processing," published by Avi.

Ideally, in a dehydration process a potato is cooked to the point where there is separation of the individual cells in the potato without unnecessary or excessive cell breakage, to prevent loss of starch from within the cells. The amount of heat needed to disintegrate the bonds between the cells varies with the solid content of the potato. Potatoes having higher levels of solids cook faster than potatoes having less solids. It has also been established that the potato varies in solid content from the outside to the inside portion, with substantially more of the starch and other solids being located near the cortical layer at the outer edge of the potato.

In conventional prior art cooking, the outer high solid content portion of the potato which requires the least heat treatment for cell separation attains the cooking temperature sooner and thus receives more heat treatment than the lower solid content area in the center of the potato which needs more heat treatment. Therefore, in past practice, it has been necessary to overcook the outer portions of the potato so the inner portions can be mashed without unnecessary cell breakage. The problem is further aggravated because the cells in the outer portion of the potato contain more starch, and therefore exhibit more swelling during cooking, which places added strain on the cell walls. The heat treatment during the cooking process gradually softens the pectic materials cementing together the cellulose of the cell walls. In some cases, small apertures are left in the cell walls through which starch particles can escape. An excessive amount of free starch in dehydrated mashed potatoes causes a pasty, undesirable texture. If cooking time is reduced to avoid excessive starch release from the cells in the outer portion of the potato, the inner portion of the potato is insufficiently cooked to produce easy cell separation. Consequently, the potato must be subjected to increased mechanical force to separate the cells and avoid lumps, but this damages the walls of the cells of both the inner and outer portions of the potato, thus releasing unwanted free starch and compounding the problem which reduced cooking was supposed to solve.

Even in those cases where large potatoes are sliced ½ inch or ¾ inch thick before cooking to speed heat transfer into the center of the potato, both the inside and outside of the potatoes are in the cooker the same length of time. Even with thinner slices of potatoes, the inner portions of the slices are often still firm while the outer portions have practically disintegrated.

U.S. Patent 3,031,314 gives an extensive discussion on proper cooking conditions for potatoes, and further elaborates on the undesirable effect of overcooking on texture and flavor.

In short, potatoes have always been cooked wrong, because the high solid portions which require the least heat treatment have been receiving the most, and the center portions of the potatoes which require the most heat treatment receive the least. This invention provides cooking methods and apparatus for correcting this error in potato cooking.

In accordance with this invention, potatoes are cooked and mashed at the same time in a combination unit which removes the cooked exterior portions of the potatoes continuously. In this manner, overcooking of the outer portions of the potatoes is eliminated, and mechanical damage to the cells of inner portions of the potatoes which require longer cooking is minimized. Moreover, the removal of the outer cooked portions of the potatoes speeds heat transfer to the central portions of the potatoes and reduces total cooking time.

In terms of method, potatoes are cooked by heating them, normally in atmospheric steam. As heat is transferred from the exterior portions of the potato, the exterior portions are hotter than the interior portions. As the heating of the potato is continued, the differential temperature between the exterior portion and the interior portion decreases and it is progressively cooked from its exterior high solid portion to its interior lower solid portion. As the exterior portion of the potato becomes cooked, it is removed and separated from the interior portion to prevent overcooking of the exterior portion and speed heat transfer to the interior portion. Heating of the uncooked portion of the potato is continued until it is cooked sufficiently to pass through the mashing step with ease and minimum mechanical force.

Preferably, the exterior portion is cooked until the potato cells begin to separate from the uncooked portion or pass through suitable mashing apparatus with minimum mechanical force.

The progressively cooked and simultaneously mashed potatoes are then dehydrated to provide a product with qualities superior to those presently produced by prior art techniques.

Alternatively, the potatoes are heated dielectrically with conventional microwave techniques to heat all portions of the potato at the same rate. But even with this type of heating, the interior and exterior portions of the potato are subjected to the same heat treatment, which results either in overcooking the higher solids exterior or undercooking the lower solids interior, unless the exterior portion is removed as it becomes cooked.

In terms of apparatus for cooking and mashing potatoes, the invention includes a container for cooking the potatoes and means for applying heat to the potatoes in the container so they are progressively cooked from their exteriors to their interiors. A mashing element is disposed in the container and means are provided for moving the potatoes into contact with the mashing element to separate with minimum mechanical force the cooked exterior portions of the potatoes to expose the interior portions.

Means are preferably provided for collecting the separated cooked portion and removing it from the uncooked portion to reduce heat treatment of the cooked portion. In one form, a belt is disposed below the masher to catch and carry away cooked portions of the potatoes separated from the uncooked portions.

In one form of the invention, the masher is a cylindrical cage made of elongated longitudinal rods which are spaced closely enough to prevent uncooked portions of the potatoes from falling through, but spaced wide enough to permit cooked potatoes to pass between the adjacent rods. Preferably, the cylindrical cage is rotated within the heated container to tumble the potatoes and cause the cooked portions to separate from the uncooked interior portions.

In another form, a screw conveyor is used to move cooked and cooking potatoes over a grate, screen, grid, or the like, to cause cooked portions to separate and pass through the grate.

These and other aspects of the invention will be more fully understood from the following detailed description and the accompanying drawings, in which:

FIG. 4 is a schematic elevation of an alternate form of apparatus for cooking potatoes in accordance with this invention;

FIG. 5 is a view taken on line 5—5 of FIG. 4;

FIG. 6 is a schematic sectional elevation of another embodiment of the invention; and FIG. 7 is a view taken on line 7—7 of FIG. 6.

Figure 1:
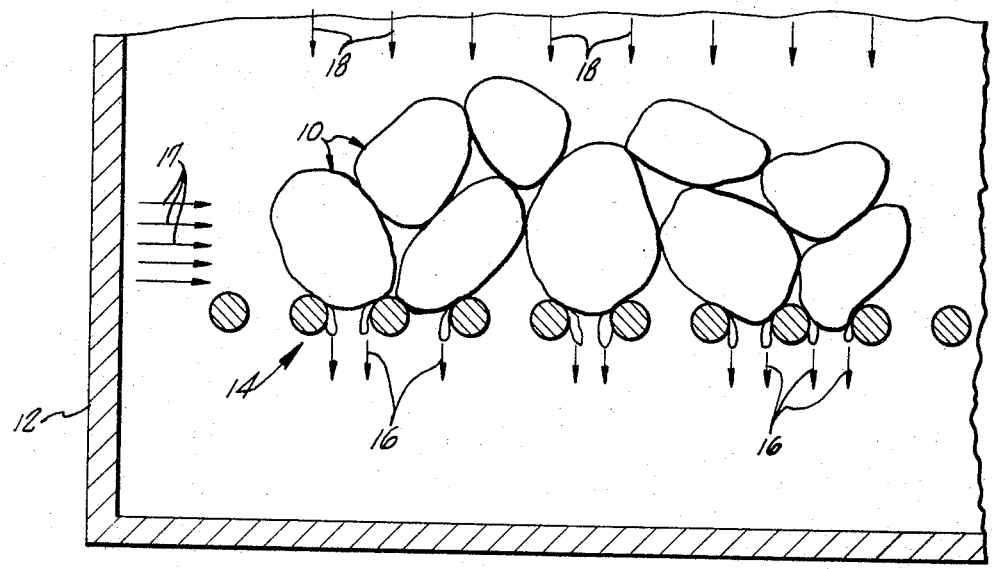
FIG. 1 is a schematic drawing showing in detail how potatoes are simultaneously cooked and mashed in accordance with this invention.

Referring to FIG. 1, potatoes 10, which may be either whole or sliced, are disposed in an insulated cooking unit 12 at a temperature of 212° F., or slightly lower, say, down to 190° F. The potatoes rest on a mashing cage or grating 14 made up of elongated parallel rods or wires 16. The potatoes are subjected to a tangential force by suitable means (several examples are described in detail with respect to FIGS. 2-7 below) as indicated by arrows 17 to slide them across the mashing cage. The potatoes are also subjected to a gentle differential mashing force indicated by vertical arrows 18. This force can be from gravity alone, or from means such as that described with respect to FIGS. 2-7 below.

As the potatoes become hot, their exterior portions cook first, not only because they are heated first, but because they have a higher solid content which naturally cooks faster than the interiors of the potatoes which have a lower solid content. As the exterior portions of the potatoes are subjected to sufficient heat treatment to permit easy cell separation, they are separated by the sliding contact with the mashing cage, and fall away from the remaining uncooked interior portions of the potatoes, leaving the interior portions exposed for continued heat treatment, which is required because of the lower solid content.

The cooked separated portions of the potatoes are collected by means (such as those described below in detail with respect to FIGS. 2-7), and removed from the cooker to avoid overcooking.

The remaining exposed interior portions of the potatoes now cook faster than they would had the exterior portions been left around them. As a consequence, the exterior portions are not overcooked, and the entire portion of the potato is cooked in less over-all time. The fuller cooking of the interior portions of the potatoes permits the cells to be separated with less mechanical force and cell damage, which would otherwise result in the release of an excessive amount of starch through the cell walls, all to the detriment of the quality of the final product.

If desired, the potatoes are heated with conventional dielectric apparatus so the interiors of the potatoes are always at substantially the same temperature as the exterior portions. Even so, the higher solids exterior portions cook faster and are removed to avoid overcooking while the incompletely cooked interior portions continue cooking.

Figure 2:
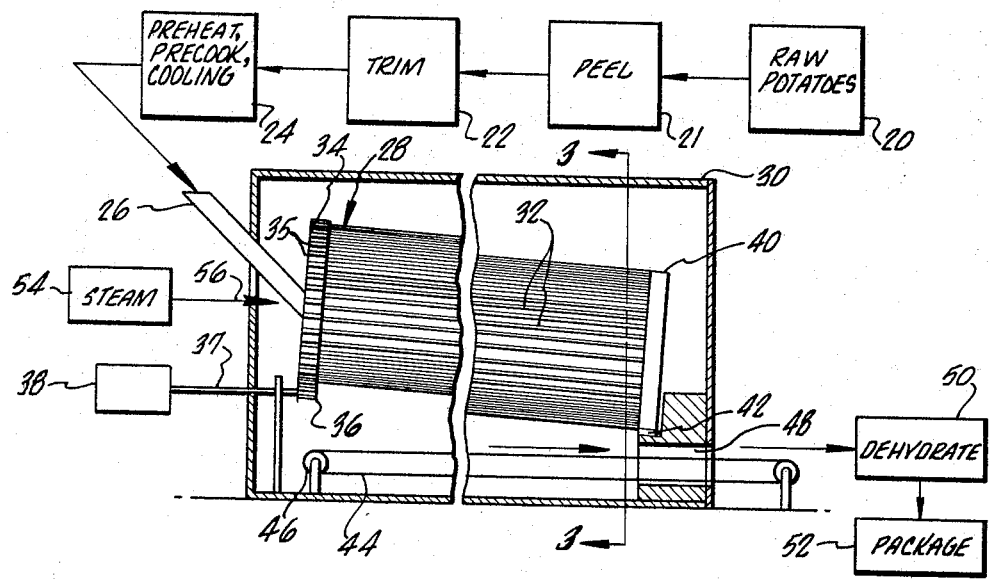
FIG. 2 is a schematic drawing of one form of apparatus used in cooking potatoes in accordance with this invention.
Figure 3:
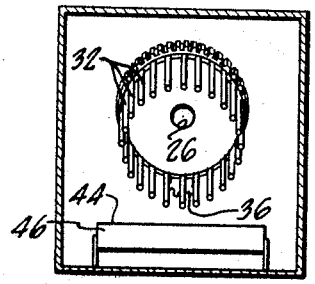
FIG. 3 is a view taken on line 3—3 of FIG. 2.

FIGS. 2 and 3 show in more detail the entire process for preparing dehydrated mashed potatoes in accordance with this invention. Raw potatoes from a source 20 are passed through a peeling stage 21 which may be the conventional lye, steam, or abrasive method, or a combination of each. The peeled potatoes are then moved through a trimming stage 22 to remove defective and diseased portions. If desired, the potatoes are subjected to special preheating, precooking, and cooling, at 24, in accordance with U.S. Patent 3,012,897.

The potatoes are then fed through a chute 26 into an elongated cylindrical mashing cage 28 mounted in an insulated cooking container 30 to rotate about an axis inclined to extend slightly downwardly and away from the chute.

The mashing cage includes a plurality of elongated parallel rods 32 secured at their ends adjacent the chute to the periphery of a ring gear 34 which has external gear teeth 35 that mesh with a driving gear 36 secured to one end of a shaft 37 powered by a motor 38 mounted outside the insulated container. The other adjacent ends of the cage rods are secured to the periphery of a circular plate 40, which is supported on stepped rollers 42 in the lower portion of the cooker. The rods can be of any type, but for conventional potato cooking, they are about ½ inch in diameter and spaced on ¾ inch centers so that the clearance between adjacent rods is about ¼ inch.

An endless collecting belt 44 is disposed under the cage around a horizontal roller 46 at the inlet end of the cage and extends the full length of the cage out of a discharge opening 48 in the opposite end of the cooker. Cooked mashed potatoes are carried from the cooker by the belt to a conventional dehydration unit 50, and then to a packing station 52.

The cooker is heated by steam introduced from a source 54 through nozzles 56 into the interior of the cooker. Any number of suitably located steam injection nozzles may be used as required to maintain the temperature inside the cooker to between about 190° F. and 212° F.

In operating the apparatus shown in FIGS. 2 and 3, potatoes entering the mashing cage through the chute are subjected to cooking temperatures inside the cooking container and are gently rolled and tumbled inside the cage. As the exterior portions of the potatoes become cooked, they are separated by the tangential force resulting from the tumbling action within the cage, and are dropped through the cage onto the collecting belt due to the gentle differential mashing force resulting from gravity and the slight centrifugal force due to the rotation of the mashing cage.

The mashed portions of the potatoes are carried by the collecting belt out of the heater so they are no longer subjected to cooking temperatures. Uncooked inner portions of the potatoes are thus freed of the outer shells of the cooked portions, so the inner portions are subjected directly to the steam and cooked more rapidly than they would otherwise.

The cooked mashed potatoes are delivered by the collecting belt to the dehydrator where they are dried, and thereafter packaged.

In the apparatus shown in FIGS. 4 and 5, an elongated horizontal generally cylindrical cooker 60 includes a feed inlet chute 62 at its left (as viewed in FIG. 4) end, and a discharge opening 64 at the lower portion of its right (as viewed in FIG. 4) end. The discharge opening is covered with longitudinally extending parallel rods or bars 66 to form a grate which permits the passage of cooked mashed potatoes and prevents the passage of uncooked potatoes. The ends of the cooker are closed, and a conventional screw conveyor 68 is mounted on a rotatable shaft 70 within the cooker to extend the entire length of the cooker. The shaft and screw conveyor are rotated by conventional means, not shown.

Steam is introduced into a preheat area 72 through steam nozzles 74 at the left (as viewed in FIG. 4) end of the cooker. A hopper 76 is secured to the cooker around the discharge opening 64 to collect mashed potatoes.

In operating the apparatus shown in FIGS. 4 and 5, potatoes are fed into the cooker through the chute 62 and subjected to cooking temperatures in the preheat area. The screw conveyor is rotated so that the potatoes are moved from left to right, as viewed in FIG. 4. By the time the potatoes reach the discharge end of the preheat section of the cooker, they have been sufficiently heated to cook the exterior portions, which are separated and passed through the bars 66 disposed over the discharge opening. Interior portions of the potatoes are moved further to the right, and subjected to additional heat treatment so that they become properly cooked and are also discharged from the cooker.

Instead of the preheat section being built integrally with the cooker-masher section, as shown in FIG. 4, a separate continuous cooker-masher, such as that shown in FIGS. 2 and 3, could be installed after conventional cookers in existing plants to avoid scrapping the conventional cooker entirely.

In the apparatus shown in FIGS. 6 and 7, an open-top inverted conical masher cage 80 is supported by an annular flange 82 on bearings 83 on an annular support ring 84 secured within the upper portion of an insulated cooker container 86. The top surface of the annular flange 82 has gear teeth 88 which are engaged by the teeth on a drive gear 89 secured to a horizontal shaft 90 extending through the cooker container and secured to a drive motor 92 mounted on the exterior of the cooker. Thus, the inverted conical mashing cage is rotatable about a vertical axis.

A plurality of downwardly and inwardly extending stationary stirring bars 93 are secured to the interior of the top 94 of the cooker and lie closely adjacent the interior of the masher cage. Potatoes are dumped into the cooker and the open top of the masher cage through a hopper 95 in the top of the cooker.

Steam is injected to the cooker through a nozzle 96. An endless collecting belt 97 under the mashing cage carries mashed potatoes out of the cooker.

The wall of the mashing cage can be made of any suitable material which provides a screen effect. For example, it can be made up of parallel rods, bars, wires, etc., or it can be a woven mesh of wires, bars, and the like.

In operating the apparatus of FIGS. 6 and 7, potatoes are dumped into the masher cage and subjected to cooking temperatures. The cage is rotated so that it moves relative to the stationary stirring bars, which tend to hold back the potatoes so the cage exerts a gentle abrading action on the surfaces of the potatoes adjacent the cage. As the exterior portions of the potatoes are cooked, they are sepaarted from the uncooked interior portions and forced through the cage by gravity and gentle centrifugal force imposed by the rotation of the cage. The cooked and mashed potatoes fall onto the belt and are carried out of the cooker.

If desired, the cage is held stationary and the stirring bars are mounted to rotate relative to the cage. Alternatively, both the cage and the stirring bars are operated to rotate simultaneously at a differential speed, either in the same or in opposite directions.

The potatoes cooked and mashed in accordance with this invention uniformly receive adeqaute cooking time to produce cell separation without excessive cell damage and the resulting undesirable loss of starch. This desirable result is achieved, even though the various portions of the potatoes cook at different rates. Consequently, the portions of the potatoes which normally cook faster are not overcooked, and those portions which cook slower are adequately cooked to insure good cell separation without cell damage.

I claim:
1. The method of cooking and mashing a potato, the method comprising heating the potato so it is progressively cooked from its exterior to its interior, removing and separating the exterior portion of the potato from the interior portion as it becomes cooked, and continuing to heat separately the exposed uncooked portion of the potato until it is cooked.

2. The method of cooking and mashing a potato, the method comprising heating the potato so it is progressively cooked from its exterior to its interior, removing and separating the exterior portion of the potato from the interior portion as it becomes sufficiently cooked for cell separation without cell rupture, and continuing to heat the exposed uncooked portion of the potato until it is cooked.

3. The method of cooking and mashing a potato, the method comprising heating the potato so it is progressively cooked from its exterior to its interior, removing and separating the exterior portion of the potato from the interior portion as it becomes cooked, continuing to heat the exposed uncooked portion of the potato until it is cooked, and thereafter dehydrating the cooked potato.

4. The method of cooking and mashing a potato, the method comprising preheating the potato to about 180° F. to about 212° F., thereafter continuing heating the potato so it is progressively cooked from its exterior to its interior, removing and separating the exterior portion of the potato from the interior portion as it becomes cooked, and continuing to heat the exposed uncooked portion of the potato until it is cooked.

5. Apparatus for cooking and mashing potatoes, the apparatus comprising a container for the potatoes, means for applying heat to the potatoes in the container so they are progressively cooked from their exteriors to their interiors, a mashing element in the container, and means for moving the potatoes into contact with the mashing element to separate the cooked exterior portions of the potatoes from the interior portions to expose the interior portions to additional cooking.

6. Apparatus for cooking and mashing potatoes, the apparatus comprising a container for the potatoes, means for applying heat to the potatoes in the container so they are progressively cooked from their exteriors to their interiors, a mashing element in the container, means for moving the potatoes into contact with the mashing element to separate the cooked exterior portions of the potatoes from the interior portions to expose the interior portions, and means for removing the separated cooked portions of the potatoes from the uncooked portions.

7. Apparatus for cooking and mashing potatoes, the apparatus comprising a container for the potatoes, means for applying heat to the potatoes in the container so they are progressively cooked from their exteriors to their interiors, a mashing element in the container, means for moving the potatoes into contact with the mashing element to separate the cooked exterior portions of the potatoes from the interior portions to expose the interior portions, and a belt disposed below the masher for catching and carrying off separated cooked portions of the potatoes.

8. Apparatus for cooking and mashing potatoes, the apparatus comprising a rotatable masher for holding the potatoes, means for applying heat to the potatoes in the masher so they are progressively cooked from their exteriors to their interiors, the masher including an open grid, and means for rotating the masher to move the potatoes into contact with the open grid to separate the cooked exterior portions of the potatoes from the interior portions to expose the interior portions.

9. Apparatus for cooking and mashing potatoes, the apparatus comprising an elongated cylindrical cage for holding the potatoes, means for applying heat to the potatoees in the cage so they are progressively cooked from their exteriors to their interiors, the wall of the cage serving as a grid-like mashing element, and means for rotating the cage to move the potatoes into contact with the mashing element and separate the cooked exterior portions of the potatoes from the interior portions to expose the interior portions.

10. Apparatus for cooking and mashing potatoes, the apparatus comprising a container for the potatoes, means for applying heat to the potatoes in the container so they are progressively cooked from their exteriors to their interiors, a mashing element in the container, and a conveyor in the container for moving the potatoes into contact with the mashing element to separate the cooked exterior portions of the potatoes from the interior portions to expose the interior portions.

11. Apparatus for cooking and washing potatoes, the apparatus comprising an inverted conical cage adapted to hold the potatoes, means for applying heat to the potatoes in the cage so they are progressively cooked from their exteriors to their interiors, a stirring element in the container, and means for moving the cage relative to the stirring element so the potatoes slide into contact with the cage wall and separate the cooked exterior portions of the potatoes from the interior portions to expose the interior portions.

References Cited

UNITED STATES PATENTS

| | | | |
|---|---|---|---|
| 1,327,254 | 1/1920 | Remmers | 99—100 |
| 1,444,346 | 2/1923 | Kohr | 146—175 |
| 2,406,769 | 9/1946 | Hosman | 99—353 |
| 3,134,413 | 5/1964 | Dorsa et al. | 146—49 |

A. LOUIS MONACELL, *Primary Examiner.*

D. M. NAFF, *Assistant Examiner.*